United States Patent [19]

Rietmüller

[11] 4,101,954
[45] Jul. 18, 1978

[54] DEVICE FOR VARIABLY ILLUMINATING AN OBJECT

[75] Inventor: Karl Heinz Rietmüller, Frankfurt, Germany

[73] Assignee: VDO Adolf Schindling AG, Frankfurt am Main, Germany

[21] Appl. No.: 803,262

[22] Filed: Jun. 3, 1977

[30] Foreign Application Priority Data

Jun. 14, 1976 [DE] Fed. Rep. of Germany ... 7618804[U]

[51] Int. Cl.² ............................................. G01D 11/28
[52] U.S. Cl. .......................................... 362/26; 362/32; 362/311; 362/322; 362/367
[58] Field of Search ............... 240/1 LP, 8.16; 362/26, 362/32, 311, 322, 367

[56] References Cited

U.S. PATENT DOCUMENTS

| 3,805,048 | 4/1974 | Brennesholtz | 240/8.16 |
| 3,819,928 | 6/1974 | Kuroyama et al. | 240/1 LP |

Primary Examiner—Stephen J. Lechert, Jr.
Attorney, Agent, or Firm—Otto John Munz

[57] ABSTRACT

A device for variably illuminating an object, such as an indicator on the instrument panel of a motor vehicle, includes a light source, a light conducting assembly for transmitting light to the object to be illuminated and a movable light control member disposed between the light source and an end of the light conducting assembly and constructed of a light conductive material, the movable member having a light transmitting surface of varying dimensions along the direction of movement of the member such that movement of the member relative to the end of the light conducting assembly varies the amount of light supplied thereto.

11 Claims, 2 Drawing Figures

DEVICE FOR VARIABLY ILLUMINATING AN OBJECT

BACKGROUND OF THE INVENTION

1. Field of the Invention

The present invention pertains to illuminating devices and, more particularly, to a device for variable illumination of an object, such as an indicator.

2. Discussion of the Prior Art

Variable devices for illuminating objects, such as indicators on the instrument panel of a motor vehicle, are conventionally provided with means for adjusting the amount or intensity of light directed to the object. Such variable illuminating devices normally include a manually adjustable resistor for regulating illumination intensity; however, the use of manually adjustable resistors has the disadvantage that the required high-load rheostat or slide resistor substantially increases production cost of the illuminating devices. Furthermore, high-load variable resistors have a relatively large structural volume and the concomitant disadvantage of rendering installation of the variable resistor adjacent an object, such as an indicator, difficult.

SUMMARY OF THE INVENTION

Accordingly, it is an object of the present invention to overcome the above mentioned disadvantages of the prior art by providing a variable illuminating device which is simple and inexpensive in structure and has a small structural volume.

Another object of the present invention is to vary the amount of light from an illuminating device without changing the electrical supply for a light source by utilizing a movable member constructed of light conducting material having a light transmitting surface of varying dimensions along the direction of movement of the member to control the amount of light transmitted from a light source to a light conducting assembly.

A further object of the present invention is to position a disc-shaped, light conductive member between a source of light and the end of a light conductive assembly, the disc-shaped member having a central axially extending light conducting shaft for transmitting light from the light source to the member and a peripheral rim movably disposed adjacent the end of the light conductive assembly defining a light transmitting surface which varies along the periphery of the member.

The present invention has an additional object in that a movable member for a variable illuminating device has a wall forming a curved light transmitting surface, the dimensions of the light transmitting surface varying along the member either by an opaque portion formed on the wall or by varying the height of the wall.

Some of the advantages of the present invention over the prior art are that the variable illumination device is simple in structure and inexpensive to manufacture, the movable member including the light conducting shaft and an adjusting shaft can be formed integrally as a single piece from a light conducting material such as polymethyl methacrylate, and the movable member is extremely small relative to the size of variable resistors used in the prior art.

The present invention is generally characterized in a device for variably illuminating an object including a light source, a light conducting assembly adapted to transmit light to the object to be illuminated and having an end for receiving light from the light source, a light control unit disposed between the light source and the end of the light conducting assembly including a movable member constructed of light conductive material receiving light from the light source and having a light transmitting surface of varying dimensions along the direction of movement of the member, the light transmitting surface being movably disposed adjacent the end of the light conducting assembly whereby movement of the member relative to the end of the light conducting assembly varies the dimensions of the portion of the light transmitting surface adjacent the end of the light conducting assembly to control the amount of light supplied to the light conducting assembly.

Other objects and advantages of the present invention will become more apparent from the following description of the preferred embodiment taken in conjunction with the accompanying drawings.

DESCRIPTION OF THE PREFERRED EMBODIMENT

Figure 1:
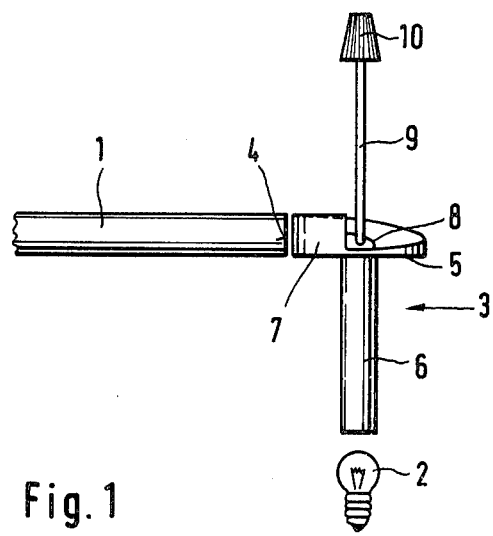
FIG. 1 is a side elevation of the variable illuminating device of the present invention.
Figure 2:
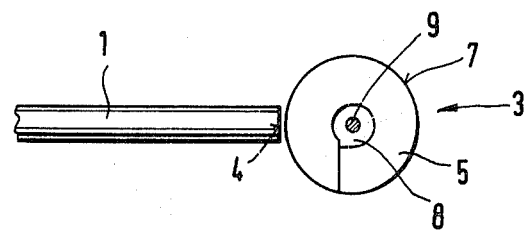
FIG. 2 is a top plan view of the variable illuminating device of FIG. 1 with the adjusting knob removed.

A device for variably illuminating an object according to the present invention is illustrated in FIGS. 1 and 2 and includes a light conducting assembly 1, which may be formed of one or more fiber optic devices, for transmitting light received from a light source 2, such as an incandescent lamp, to an object to be illuminated (not shown), such as an indicator on the instrument panel of a motor vehicle. A light control unit 3 is disposed between the lamp 2 and an end 4 of the light conducting assembly 1 and is formed of a disc-shaped rotatably movable member 5 having a central, axial light conducting shaft 6 extending therefrom to a position adjacent the lamp 2. The movable member 5 has a wall defining a peripheral light transmitting surface 7 which is arranged adjacent the end 4 of the light conducting assembly; and, on a side opposite the lamp 2, the movable member 5 has a recess of conical or funnel-like configuration forming a reflecting area 8 for increasing the quantity of light reflected by the light transmitting surface 7. An adjusting shaft 9 extends axially from the movable member 5 and terminates at an adjustment knob 10 to permit the movable member to be rotated about its axis by turning the knob 10.

The movable member 5 is made of a light conducting material, such as polymethyl methacrylate, and is formed integrally with the light conducting shaft 6. Preferably, the adjusting shaft 9 is also integrally formed with the movable member 5 and the light conducting shaft 6 such that the light control unit 3 is formed of a single piece. The light transmitting surface 7 of the movable member has varying dimensions along the periphery of the member such that, as the member is rotatably moved relative to the end 4 of the light conducting assembly 1, the dimensions of the portion of the light transmitting surface 7 adjacent the end of the light conducting assembly are varied to control the amount or intensity of light supplied to the light conducting assembly and transmitted therethrough to the object to be illuminated.

The dimensional variation of the surface 7 can be formed in any suitable manner but, preferably, is formed by the outer wall of the movable member 5 having a varying height or by rendering a portion of the wall opaque, such as by coating the wall with a layer of opaque material. In either case, the height of the portion of the light transmitting surface 7 adjacent the end of the light conducting assembly varies along the direction of movement of member 5; and, preferably, the dimensional variation of the light transmitting surface 7 is gradual and continuous to facilitate adjustment of illumination. Of course, the dimensional variation of the light transmitting surface 7 could have any desired pattern with the attendant result that the amount of illumination provided to the object would not be linearly controlled by the knob 10. The use of a disc-shaped member 5 with the wall height varying along the peripheral direction of movement has the advantage that no additional processes are required once the single piece, light control unit 3 is molded.

In operation, light is transmitted from lamp 2 to movable member 5 via light conducting shaft 6, and the amount of light transmitted to the light conductive assembly 1 via end 4 is controlled by the area of the light transmitting surface 7 adjacent the end 4. In this manner, by turning knob 10, the amount of illumination on an object can be varied with maximum light supplied when the height of the light transmitting surface 7 is substantially the same as the diameter of the end 4 of the light conducting assembly, and minimum light supplied when the height of the light transmitting surface 7 is no more than a small fraction of the diameter of the end 4 of the light conducting assembly.

Inasmuch as the present invention is subject to many variations, modications and changes in detail, it is intended that all subject matter discussed above or shown in the accompanying drawings be interpreted as illustrative and not in a limiting sense.

What is claimed is:

1. A device for variably illuminating an object comprising a light source;
   light conducting means adapted to transmit light to the object to be illuminated and having an end for receiving light from said light source;
   light control means disposed between said light source and said end of said light conducting means including a movable member constructed of light conductive material receiving light from said light source and having a light transmitting surface of varying dimensions along the direction of movement of said member, said light transmitting surface being movably disposed adjacent said end of said light conducting means, the movement of said member relative to said end of said light conducting means varying the dimensions of the portion of said light transmitting surface adjacent said end of said light conducting means to control the amount of light supplied to said light conducting means.

2. A device for variably illuminating an object as recited in claim 1, said light transmitting surface has a curved configuration and said movable member being rotatable about a central axis.

3. A device for variably illuminating an object as recited in claim 2, said light transmitting surface having an annular configuration.

4. A device for variably illuminating an object as recited in claim 3, said movable member having a wall forming said light transmitting surface having a varying height to define said varying dimensions of said light transmitting surface along said member.

5. A device for variably illuminating an object as recited in claim 3, said movable member having a wall forming said light transmitting surface with an opaque portion of varying dimensions to define said varying dimensions of said light transmitting surface along said member.

6. A device for variably illuminating an object as recited in claim 3, said movable member having a portion on a side opposite said light source for reflecting light.

7. A device for variably illuminating an object as recited in claim 2, wherein said movable member including an axially extending adjusting shaft for rotating said movable member.

8. A device for variably illuminating an object as recited in claim 2 and further comprising a light conducting shaft extending axially from said movable member to transmit light from said light source to said movable member.

9. A device for variably illuminating an object as recited in claim 1, said movable member provided with a wall forming said light transmitting surface having a varying height to define said varying dimensions of said light transmitting surface along said member.

10. A device for variably illuminating an object as recited in claim 1, said movable member provided with a wall forming said light transmitting surface with an opaque portion of varying dimensions to define said varying dimensions of said light transmitting surface along said member.

11. A device for variably illuminating an object as recited in claim 1, said movable member having a recess of conical configuration on a side opposite said light source for reflecting light.

* * * * *